United States Patent [19]

Sato

[11] 3,944,877
[45] Mar. 16, 1976

[54] WIRELESS MULTIFLASHLIGHT APPARATUS FOR A PHOTOGRAPHIC CAMERA

[75] Inventor: Fukuji Sato, Tokyo, Japan

[73] Assignee: Satoh Cohki Co., Ltd., Tokyo, Japan

[22] Filed: June 13, 1974

[21] Appl. No.: 479,111

[30] Foreign Application Priority Data
June 15, 1973 Japan.................................. 48-67593

[52] U.S. Cl........... 315/241 P; 250/214 P; 250/206; 315/149; 315/155
[51] Int. Cl.²......................................... H05B 41/30
[58] Field of Search ............ 315/241 P, 155 C, 149; 250/214 P, 206 E

[56] References Cited
UNITED STATES PATENTS

| 3,156,827 | 11/1964 | Porteous et al. ................. 250/214 P |
| 3,196,275 | 7/1965 | Atkins et al. ................. 250/214 P X |

OTHER PUBLICATIONS

Radio & Television News, "A Wireless Extension Flash Unit" pp. 64, 65 Oct. 1949, by G. Southworth.

*Primary Examiner*—John Kominski
*Attorney, Agent, or Firm*—Flynn & Frishauf

[57] ABSTRACT

A wireless multiflashlight apparatus simultaneously illuminates a subject by flashlight rays emitted from a main flashlight device mounted on a photographic camera and at least one additional flashlight device located at suitable position away from the main flashlight device. In the main flashlight device is provided a flash tube arranged to emit substantially two or more flashlight rays at a predetermined time interval therebetween upon the shutter operation of an associated camera. In the additional flashlight device are provided a decoder for producing an outlet signal only upon receipt of the flashlight rays from the main flashlight device through a photo-electric conversion element and an amplifier, and a flash tube operative to be triggered only by the output signal from the decoder. The additional flashlight device is protected from inadvertently flashing even upon reception of any flashlight rays from other flashlight devices than the associated main flashlight device.

8 Claims, 28 Drawing Figures

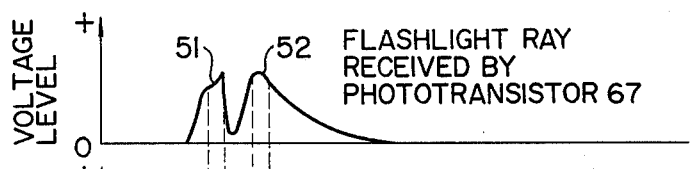
FIG. 5A — FLASHLIGHT RAY RECEIVED BY PHOTOTRANSISTOR 67
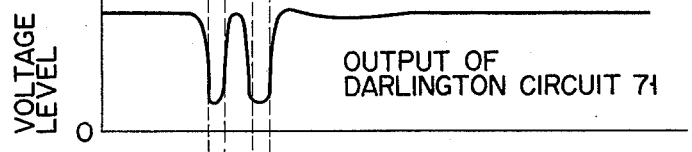
FIG. 5B — OUTPUT OF DARLINGTON CIRCUIT 71
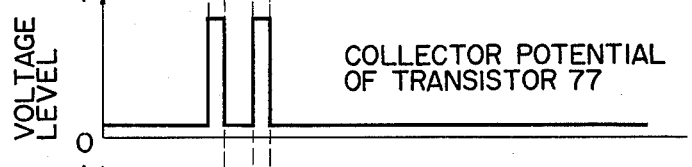
FIG. 5C — COLLECTOR POTENTIAL OF TRANSISTOR 77
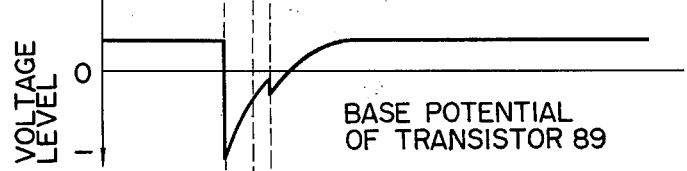
FIG. 5D — BASE POTENTIAL OF TRANSISTOR 89
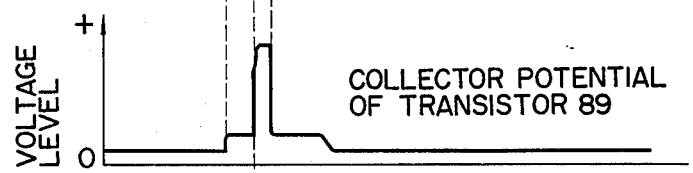
FIG. 5E — COLLECTOR POTENTIAL OF TRANSISTOR 89
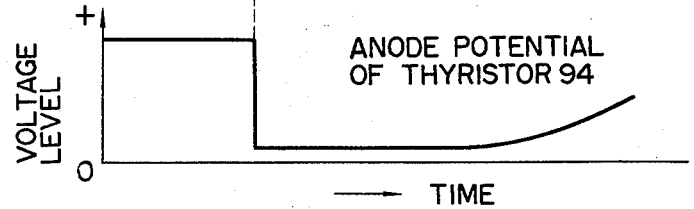
FIG. 5F — ANODE POTENTIAL OF THYRISTOR 94
TIME

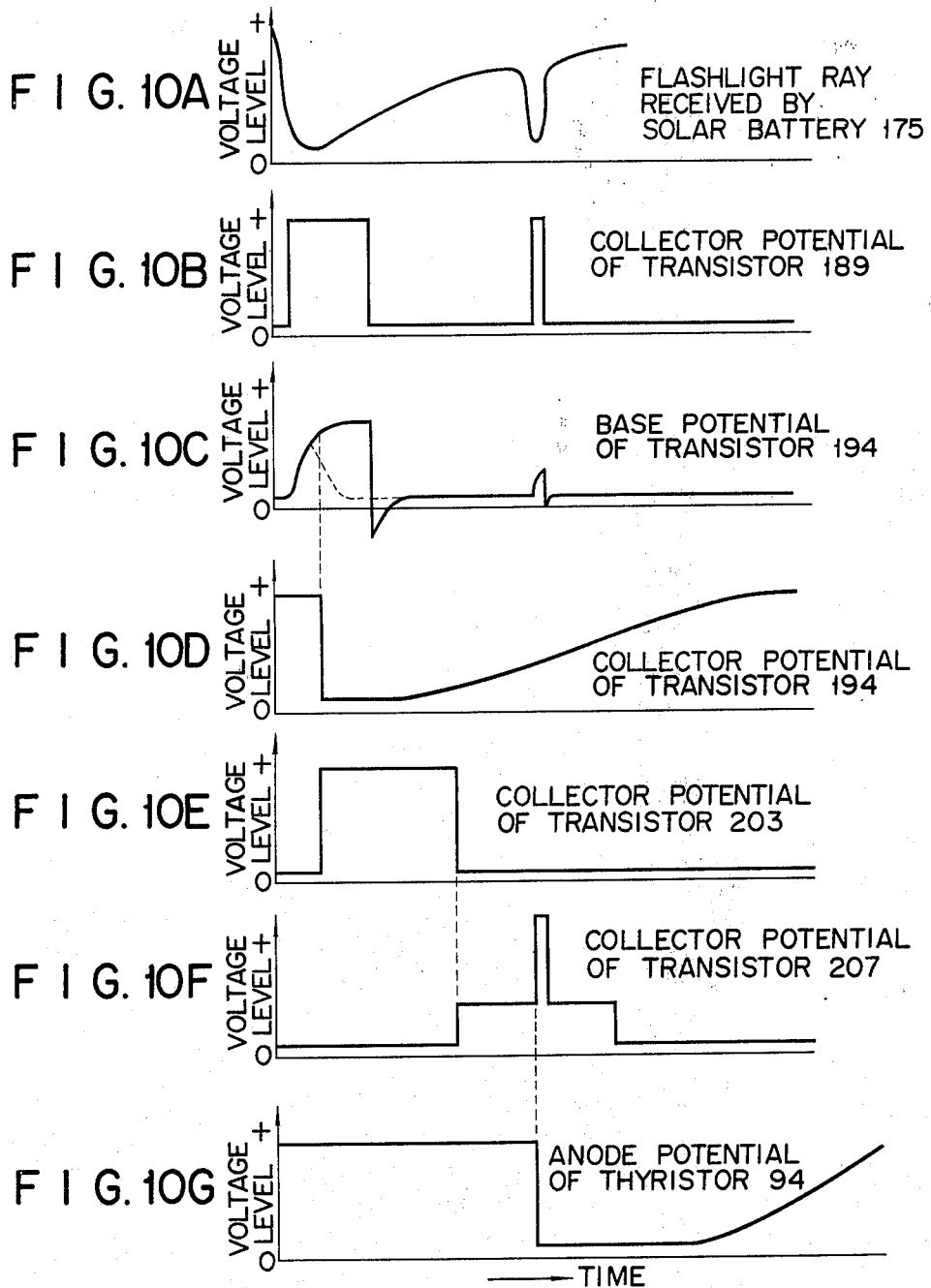

F I G. 13
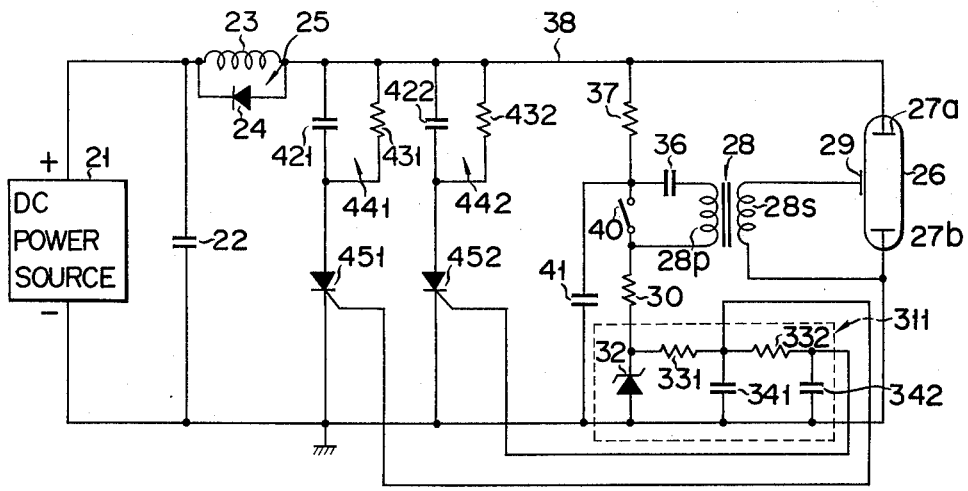
F I G. 14
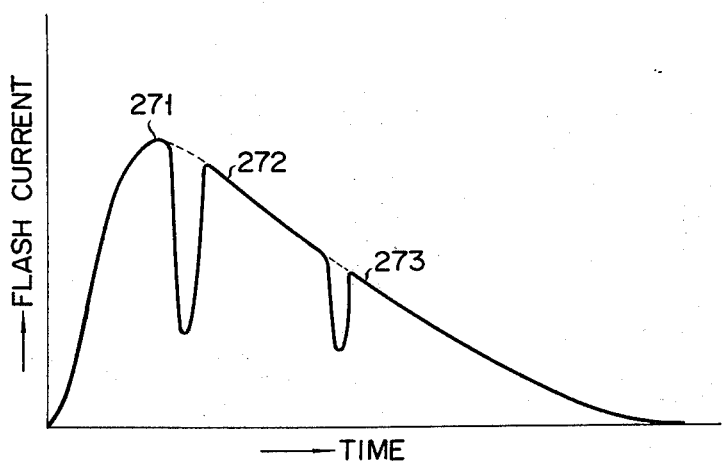

WIRELESS MULTIFLASHLIGHT APPARATUS FOR A PHOTOGRAPHIC CAMERA

BACKGROUND OF THE INVENTION

This invention relates to a multiflashlight apparatus for a photographic camera for simultaneously illuminating a foreground subject being photographed by emitting a plurality of flashlight rays, and more in particular to a wireless multiflashlight apparatus.

Conventional multiflashlight apparatuses include a "wired" type comprising a plurality of flashlight devices spatially located in the neighborhood of a foreground subject being photographed and connected through respective wires with a photographic camera so as to emit flashlight rays for simultaneously illuminating the subject upon the shutter operation of the camera, and a "wireless" type comprising a main flashlight device mounted on a photographic camera to emit a flashlight ray for illuminating a foreground subject being photographed upon the shutter operation of the camera and one or more additional flashlight devices operative to be triggered by the flashlight ray from the main flashlight device so as to emit flashlight rays for illuminating the subject. In the former wired type multiflashlight apparatus, the respective flashlight devices can emit flashlight rays only upon the shutter operation of the associated camera without being misflashed in response to the shutter operation of any other cameras than the associated camera. However, a cumbersome operation is required prior to photography, since the respective flashlight devices should be wired to the associated camera so as not to obstruct photography. In the wireless multiflashlight apparatus, the additional flashlight device can be freely located at any positions in the neighborhood of a subject being photographed without the necessity of being wired to the associated camera. Where, however, the subject is simultaneously photographed by a plurality of cameras, the additional flashlight devices are disadvantageously triggered not only by a flashlight ray from the associated main flashlight device, but also by flashlight rays from other flashlight devices than the associated main flashlight device.

It is accordingly the object of this invention to provide an improved wireless multiflashlight apparatus for a photographic camera, in which each additional flashlight device can be triggered only by a flashlight ray from a main flashlight device mounted on an associated camera to emit a flashlight ray.

SUMMARY OF THE INVENTION

A wireless multiflashlight apparatus according to this invention is characterized in that a main flashlight device includes a flash tube operative to generate two or more flashlight rays at a predetermined time interval upon the shutter operation of an associated camera; and a respective additional flashlight device includes a decoder operative to deliver an output signal only upon receipt of said flashlight rays from the associated main flashlight device, and a flash tube operative to be triggered only by the output signal from the decoder to emit a flashlight ray.

According to the wireless multiflashlight apparatus so constructed, the additional flashlight device generates a flashlight ray only when a particular set of flashlight rays is received from the associated main flashlight device. Thus it is possible to reliably prevent a misflash as caused in the prior art due to a flashlight ray being emitted from any other flashlight devices than the associated main flashlight device.

BRIEF DESCRIPTION OF THE DRAWINGS

FIGS. 5A and 5F show waveforms of various circuit portions of FIG. 4;

FIGS. 10A and 10G show waveforms of various circuit portions of FIG. 9;

FIG. 13 shows a practical circuit arrangement of a main flashlight device modified from FIG. 2;

FIG. 14 shows a waveform of a flashlight as obtained from the flash tube of FIG. 13;

PREFERRED EMBODIMENTS OF THE INVENTION

Figure 1:
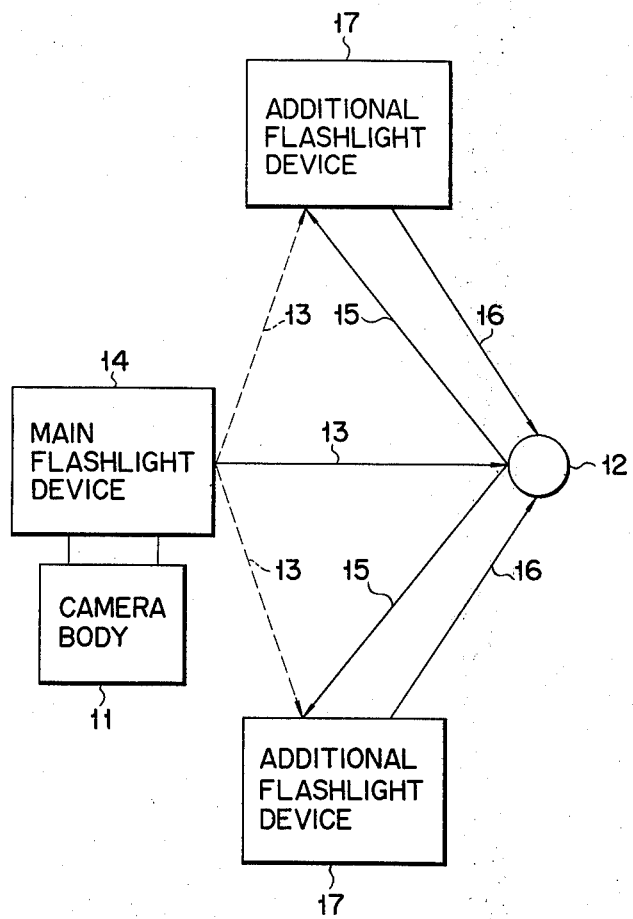
FIG. 1 is a schematic block diagram showing a general arrangement of a wireless multiflashlight apparatus for a photographic camera.

A wireless multiflashlight apparatus for a photographic camera generally comprises, as shown in FIG. 1, a main flashlight device 14 mounted on a camera body 11 so as to generate a flashlight ray 13 for illuminating a foreground subject 12 being photographed upon the shutter operation of the camera, and one or more (two in the Figure) additional flashlight devices 17 spatially disposed at any positions apart from the main flashlight device 14 and in the neighborhood of the subject 12 so as to receive a light 15 generated by the main flashlight device 14 and reflected from the subject 12 or directly to receive a flashlight ray 13 as shown in a dotted line emitted from the main flashlight device 14 and to be triggered by the received ray to emit a flashlight ray 16 for illuminating the subject 12.

According to the wireless multiflashlight apparatus so constructed, it is possible to illuminate any desired subject being photographed concurrently by a plurality of flashlight rays emitted upon the shutter operation of a camera. Therefore it is suitable to photograph a subject at a dark place or at a location considerably apart from the subject.

Figure 2:
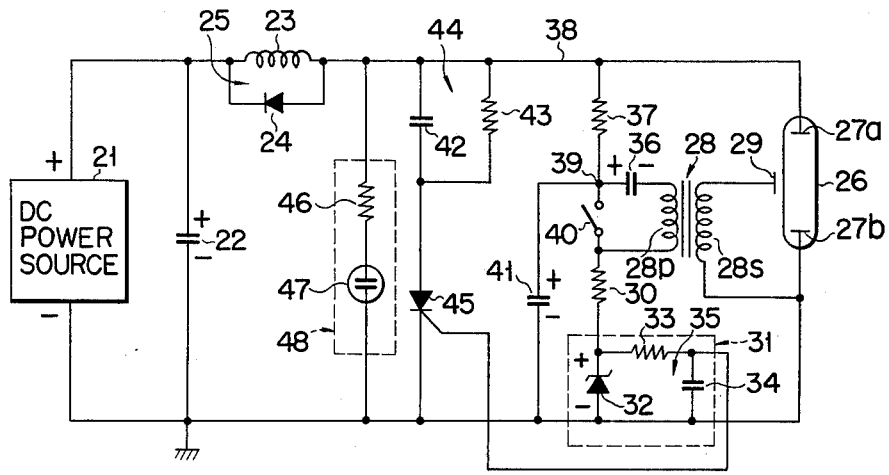
FIG. 2 is a practical circuit arrangement of a main flashlight device used in a wireless multiflashlight apparatus according to one embodiment of this invention.

FIG. 2 shows a practical circuit arrangement of a main flashlight device used in a wireless multiflashlight apparatus according to one embodiment of this invention. In the Figure, a reference numeral 21 denotes a DC power source of relatively high voltage, for example, 300 volts. Across the DC power source, a storage or flash capacitor 22 is connected. Between both the plates of the flash capacitor 22, a pair of main electrodes 27a and 27b of a flash tube 26, for example, a xenon tube are connected via a parallel circuit 25 of an inductance coil 23 and a diode 24 with the indicated polarity. The flash tube 26 has a trigger electrode 29 connected to one end of a secondary winding 28S which, together with a primary winding 28P, constitutes a trigger transformer 28 with the primary and secondary windings electromagnetically coupled to each other. The other end of the secondary winding 28S is connected to the main electrode 27b of the flash tube 26 and also to the grounded negative pole of the DC power source 21.

One end of the primary winding 28P is connected to ground via a resistor 30 and a timer circuit 31 as hereinunder described. The timer circuit 31 comprises a zener diode 32 with its anode grounded and an integration circuit 35 constructed of a resistor 33 and a capacitor 34 connected in series between the cathode of the zener diode 32 and ground. The other terminal of the primary winding 28P is connected, via a trigger capacitor 36 and a resistor 37, to a junction of the parallel circuit 25 with the main electrode 27a of the flash tube 26 i.e. to a positive side power source line 38 coupled via the parallel circuit 25 with the non-grounded positive pole of the DC power source 21. A junction 39 of the trigger capacitor 36 with the resistor 37 is connected via a normally open switch 40 closed in synchronism with the shutter operation of the associated camera (not shown) to the one end of the primary winding 28P and also connected to ground via a capacitor 41. Between the positive power source line 38 and ground, a parallel circuit 44 of a capacitor 42 and a resistor 43 is connected in series with the main current conduction path of a switching element, for example, the anode-cathode path of a thyristor 45. The gate electrode of the thyristor 45 is connected to the output terminal of the timer circuit 31 i.e. a junction of the resistor 33 and the capacitor 34.

Let us explain the operation of the main flashlight device arranged as shown in FIG. 2.

Firstly, let it be assumed that the switch 40 is kept open and a voltage substantially equal to that of the DC power source 21 is precharged across the capacitors 22, 36 and 41 with the indicated polarity.

When, under this condition, the shutter of the associated camera is manipulated, the switch 40 is closed in synchronism with the shutter operation. As a result, the stored voltage on the trigger capacitor 36 is discharged through the closed switch 40 and the primary winding 28P of the trigger transformer 28 so as to cause the transformer 28 to be excited, whereby the flash tube 26 is triggered through the secondary winding 28S of the excited transformer 28. At the same time, the stored voltage on the flash capacitor 22 is discharged through the parallel circuit 25 and the triggered flash tube 26 so as to initiate to emit a flashlight ray from the flash tube 26, and the stored voltage on the capacitor 41 is discharged through the closed switch 40, the resistor 30 and the zener diode 32 included in the timer circuit 31, thereby causing a constant voltage having a predetermined value, for example, 12 volts to be induced between the anode and cathode of the zener diode 32. The induced voltage is charged through the resistor 33 on the capacitor 34 with the lapse of time. When the charged voltage on the capacitor 34 reaches a predetermined value after the length of a time determined by a time constant which is derived from a product of the capacitance of the capacitor 34 and the resistance of the resistor 33, then the thyristor 45 is triggered. For this reason, most of the discharging current of the flash capacitor 22 temporalily flows through the parallel circuit 44 and anode-cathode path of the triggered thyristor 45 so as to charge the capacitor 42 included in the parallel circuit 44. As a result, electric current flowing from the flash capacitor 22 into the flash tube 26 is very much decreased temporarily. When the charged voltage on the capacitor 42 becomes substantially equal to that of the flash capacitor 22, then the thyristor 45 is naturally turned off and the electric current which flows from the flash capacitor 22 into the flash tube 26 is again prominently increased. The stored voltage on the capacitor 42 is cleared through the resistor 43.

As will be evident from the above, the flash tube 26 initiates to emit a first flashlight ray 51 (see FIG. 3) in synchronism with the shutter operation of the associated camera and when the charged voltage on the integration capacitor 34 included in the timer circuit 31 reaches a predetermined voltage, then the emitting of the flashlight ray from the flash tube 26 is substantially interrupted temporarily. When the charged voltage on the capacitor 42 included in the parallel circuit 44 becomes substantially equal to that of the flash capacitor 22, then emitting of a second flashlight ray 52 (see FIG. 3) is initiated.

Figure 3:
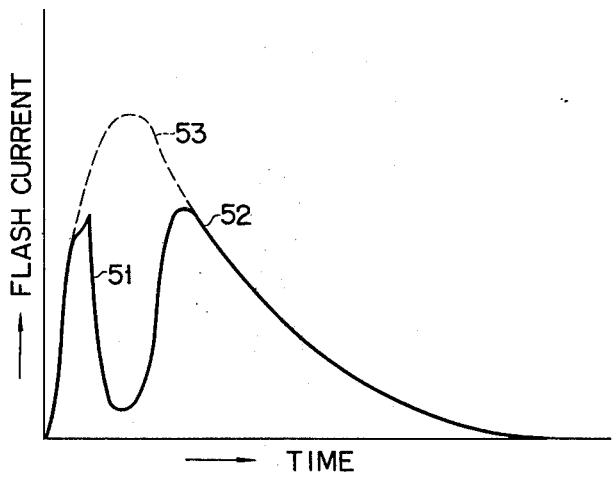
FIG. 3 is a graphical representation showing a relation between a lapse of time and the amount of current flowing through the flash tube of FIG. 2.

A waveform portion 53 indicated by a dotted line in FIG. 3 denotes, in the absence of the parallel circuit 44 and thyristor 45, a corresponding waveform portion of the flashlight ray to be emitted from the flash tube 26.

The inductance coil 23 shown in FIG. 2 serves to make sharp the rising and decaying of the first flashlight ray 51 and the rising of the second flashlight ray 52.

When the discharging current in accordance with the stored voltage on the flash capacitor 22 flows through the flash tube 26 and/or the series circuit of the parallel circuit 44 and the thyristor 45, the diode 24 serves to prevent the discharging current from being conducted from the flash tube 26 and/or the series circuit back to the flash capacitor 22.

In FIG. 2, a series circuit 48 of an indicator tube 47, such as a neon tube, and a resistor 46 connected between the positive power source line 38 and ground is an availability-confirming circuit operative to light the indicator tube 47 only when a voltage sufficient to cause the flash tube 26 to emit a flashlight ray as mentioned above is preliminarily charged on the flash capacitor 22.

Figure 4:
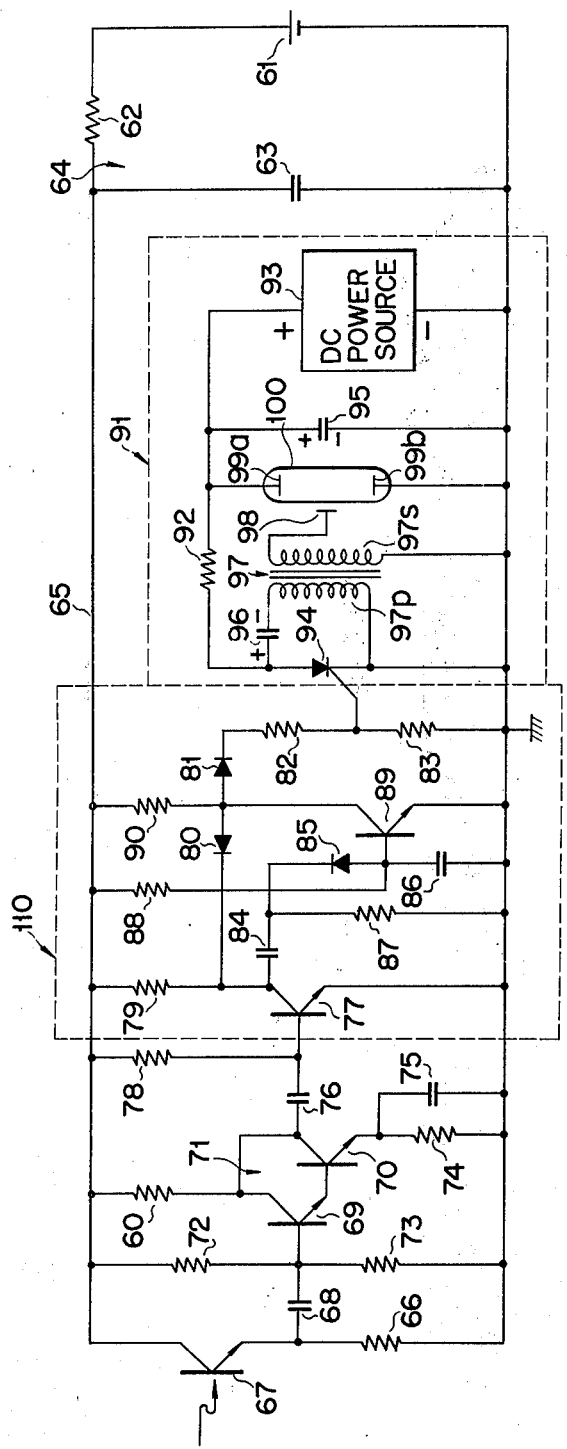
FIG. 4 is a practical circuit arrangement of an additional flashlight device according to this invention which is used in combination with the main flashlight device of FIG. 2.

FIG. 4 shows a practical circuit arrangement of an additional flashlight device according to this invention which should be used with the main flashlight device shown in FIG. 2. In FIG. 4, a reference numeral 61 is a DC power source having a relatively low voltage, for example, about 6 volts. The positive pole of the DC power source 61 is connected, via a conventional smoothing circuit 64 constructed of a resistor 62 and a capacitor 63, to a positive power source line 65 of a main circuit portion of FIG. 4 and the negative pole of the DC power source is connected to ground. Two flashlight rays 51 and 52, as shown in FIG. 3, emitted from the flash tube 26 of the main flashlight device shown in FIG. 2 are received by a photoelectric conversion element, for example, by the base of an npn type phototransistor 67 having a collector directly connected to the positive power source line 65 and an emitter connected to ground via a resistor 66. The emitter of the phototransistor 67 is also connected via a coupling capacitor 68 to the base of an npn type transistor 69 directly coupled to a npn type transistor 70, the transistors 69 and 70 jointly constituting a conventional Darlington circuit 71. The base of the transistor 69 is connected to the positive power source line 65 via a resistor 72 and also to ground via a resistor 73. The emitter of the transistor 70 in the Darlington circuit 71 is connected to ground via a parallel circuit of a resistor 74 and a capacitor 75. The common collector of the transistors 69 and 70 is connected via a resistor 60 to the positive power source line 65 and also to the collector of an npn type grounded-emitter transistor 77 via a coupling capacitor 76. The base of the transistor 77 is also connected via a resistor 78 to the positive power source line 65. The collector of the transistor 77 is connected via a resistor 79 to the positive power source line 65 and also to ground via a series circuit constructed of two diodes 80 and 81 with the opposite polarities and two resistors 82 and 83. The collector of the transistor 77 is also connected to ground via a series circuit of a capacitor 84, a diode 85 with the indicated polarity and a capacitor 86. A resistor 87 is connected between the ground and a junction of the capacitor 84 with the cathode of the diode 85. A junction of the anode of the diode 85 and the capacitor 86 is connected to the base of an npn type ground-emitter transistor 89 which is connected via a resistor 88 to the positive power source line 65. The collector of the transistor 89 is connected to the common anode of the diodes 80 and 81 and also connected via a resistor 90 to the positive power source line 65.

Further a flashlight source 91 as hereinunder described is provided. The flashlight source 91 comprises a switching element, for example, a thyristor 94 having a control or gate electrode connected to a junction of the resistors 82 and 83, an anode elelctrode connected via a resistor 92 to the positive pole of a DC power source 93 with a relatively high voltage, for example, 300 volts, and a cathode electrode connected to a grounded negative pole of the DC power source 93; a flash capacitor 95 connected across the DC power source 93; a trigger transformer 97 consisting of a primary winding 97P having one end connected via a trigger capacitor 96 to the anode of the thyristor 94 and the other end connected to ground, and a secondary winding 97S electromagnetically coupled to the primary winding 97P and having one end connected to ground; and a flash tube 100 having a trigger electrode 98 connected to the other end of the secondary winding 97S and a pair of main electrodes 99a and 99b connected between both the plates of the flash capacitor 95.

Let us now explain by reference to FIGS. 5A to 5F the operation of the additional flashlight device arranged as shown in FIG. 4.

When no flashlight ray is received by the phototransistor 67, then the transistor 89 is set at a conductive state through the base bias resistor 88 and in consequence the collector potential thereof is made substantially equal to the ground potential. In this state, the potential of a junction of the resistors 82 and 83 is also kept substantially equal to the ground potential and the thyristor 94 is held in a nonconductive state. Therefore, no flashlight ray is emitted from the flash tube 100 included in the flashlight source 91. At this time, a voltage substantially equal to that of the DC power source 93 is precharged on the flash capacitor 95 and the trigger capacitor 96 included in the flashlight source 91.

When, under this condition, two flashlight rays 51 and 52 as shown in FIG. 5A (see FIG. 3), emitted at a predetermined time interval from the flash tube 26 in the main flashlight device of FIG. 2 are received by the phototransistor 67, then photoelectric current of an amount proportionate to the received flashlight ray flows through the collector-emitter path of the phototransistor 67 to induce across the resistor 66 two signals having voltage levels in response to the received flashlight rays 51 and 52. Only those portions of these two signals which have a level higher than a predetermined threshold are amplified by the Darlington circuit 71, inverted in phase and then derived from the output terminal of the Darlington circuit 71 (see FIG. 5B). The two output signals from the Darlington circuit 71 are applied as reverse biased voltages to the base of the transistor 77 which is normally set at a conductive state through the base bias resistor 78. For this reason, the transistor 77 is made nonconductive only during the time period in which said two output signals are applied thereto from the Darlington circuit 71 and consequently the collector potential thereof is changed from the ground potential to the potential of the positive power source line 65 (see FIG. 5C). During the time period in which the transistor 77 is held in a nonconductive state by the first output signal from the Darlington circuit 71, a voltage substantially equal to that of the positive power source line 65 is charged on the capacitor 84 through the resistors 79 and 87. At the moment the transistor 77 is again rendered conductive by decaying of the first output signal from the Darlington circuit 71, the stored voltage on the capacitor 84 is discharged through the conducted transistor 77, capacitor 86 and forwardly biased speed-up diode 85. As a result, a reverse bias voltage which progressively increases from a voltage substantially equal to, but opposite in polarity from, that of the positive power source line 65 toward the ground potential is applied with the lapse of time through the capacitor 86 to the base of the transistor 89, changing the transistor 89 from its conductive state to its nonconductive state.

During the time period in which the transistor 77 is held in a nonconductive state by the second output signal from the Darlington circuit 71, a predetermined voltage is charged, as mentioned above, on the capacitor 84 (The charged voltage — since the preceding charged voltage remains to a certain extent — has a level lower than the preceding charged voltage by that extent.). When the transistor 77 is again rendered conductive by decaying of the second output signal from the Darlington circuit 71, the stored voltage on the capacitor 84 is discharged through the conducted transistor 77, capacitor 86 and forwardly biased speed-up diode 85, keeping the transistor 89 in a nonconductive state.

When the discharge operation of the capacitor 84 is completed, a voltage acting as a forward biasing voltage with respect to the base of the transistor 89 is charged on the capacitor 86 from the positive power source line 65 through the resistor 88. When this charged voltage reaches a predetermined level, the transistor 89 is made again conductive. As a result, the collector potential of the transistor 89 is varied with the lapse of time as shown in FIG. 5E. Namely, 1. When no flashlight ray is received by the phototransistor 67, the transistor 89 is set in a conductive state through the base bias resistor 88 (Under this condition, the transistor 77 is also made conductive through the base bias resistor 78.) and in consequence the collector potential of the transistor 89 is held substantially at the ground potential. In this state, the thyristor 94 is held in an OFF state and no flashlight ray is emitted from the flashlight tube 100 in the flashlight source 91.

2. When the first flashlight ray 51 is shown in FIG. 5A is received by the phototransistor 67, the transistor 77 is made nonconductive by the received flashlight ray 51 through the Darlington circuit 71. During the length of time in which the transistor 77 is set in a nonconductive state, i.e. the received flashlight ray 51 is present, a voltage as mentioned above is charged on the capacitor 84. At the instant the received flashlight ray 51 disappears, the transistor 77 is again made conductive and, at the same time, the transistor 89 is rendered nonconductive through the aforesaid discharge operation in accordance with the stored voltage on the capacitor 84. Under this condition, the collector potential of the transistor 89 is increased from the ground potential to a relatively low positive voltage which is obtained by dividing the voltage of the positive power source line 65 by a ratio of the resistance of the resistor 90 to a series composite resistance resulting from the forward resistance of the forwardly biased diode 80 and the internal resistance of the conducted transistor 77. However, current flowing through a series circuit of the forwardly biased diode 81 and the resistors 82 and 83 in accordance with said divided voltage is relatively small and in consequence a voltage induced across the resistor 83 has a relatively low level. Therefore, the thyristor 94 is not triggered by this voltage and still held in an OFF state, causing no flashlight ray to be emitted from the flash tube 100 in the flashlight source 91. As will be evident from the above, this state is continued until the second flashlight ray 52 as shown in FIG. 5A is received by the phototransistor 67.

3. When the second flashlight ray 52 is shown in FIG. 5A is received by the phototransistor 67, the received flashlight ray 52 is applied through the Darlington circuit 71 to the transistor 77. During the length of time in which the flashlight ray 52, as in the first flashlight ray 51, is present, the transistor 77 is set in a nonconductive state and at the time of decaying of the flashlight ray 52, the transistor 77 is again made conductive. As will be appreciated from the above, the transistor 89 is changed from a conductive state to a nonconductive state at the time of decaying of the first flashlight ray 51. This state is continued until the above-mentioned second discharge operation of the capacitor 84 is completed after the disappearance of the second flashlight ray 52. Accordingly, only during the time period in which the second flashlight ray 52 is present, the transistors 77 and 89 are set in a nonconductive state. At this time the collector potential of the transistor 89 becomes a relatively high positive voltage which is obtained by dividing the voltage of the positive power source line 65 by a ratio of the resistance of the resistor 90 to a series composite resistance resulting from the forward voltage of the forward biased diode 81 and a series resistance of the resistors 82 and 83. This voltage is prominently higher than the abovementioned voltage obtained when the transistor 89 is in a non-conductive state and the transistor 77 is in a conductive state. Consequently, a voltage induced at this time across the resistor 83 becomes prominently higher, thereby causing the thyristor 94 to be triggered into conduction (see FIG. 5F). Thus, at the moment the thyristor 94 is turned on, the above-mentioned precharged voltage on the trigger capacitor 96 is discharged through the first thyristor 94 and the primary winding 97P of the trigger transformer 97 to cause the transformer 97 to be excited. Since the flash tube 100 is triggered through the secondary winding 97S of the excited transformer 97, the above-mentioned precharged voltage on the flash capacitor 95 is dishcarged through the triggered flash tube 100 and in consequence a flashlight ray for illuminating a subject being photographed (not shown) is emitted from the flash tube 100.

As will be evident from the above, when two flashlight rays 51 and 52 (as shown in FIGS. 3 and 5A) from the main flashlight device of FIG. 2 are received by the phototransistor 67 in the additional flashlight device of FIG. 4, a circuit portion (enclosed by a broken line 110 in FIG. 4) including the transistors 77 and 89 and diodes 80 and 81 of controls the collector potential of the transistor 89 dependent upon the presence or absence of the received flashlight rays 51 and 52, in the same manner as the conventional AND gate, thereby causing the thyristor 94 to be triggered only when the normally conducting transistors 77 and 89 are simultaneously made nonconductive and in consequence permitting a flashlight ray for illuminating a desired subject being photographed to be emitted from the flash tube 100 in the flashlight source 91. As a result, the aforesaid circuit portion 110 acts as one kind of decoder operative to produce an output signal only when the two flashlight rays 51 and 52, with the specified interval therebetween are received by the phototransistor 67.

Figure 6:
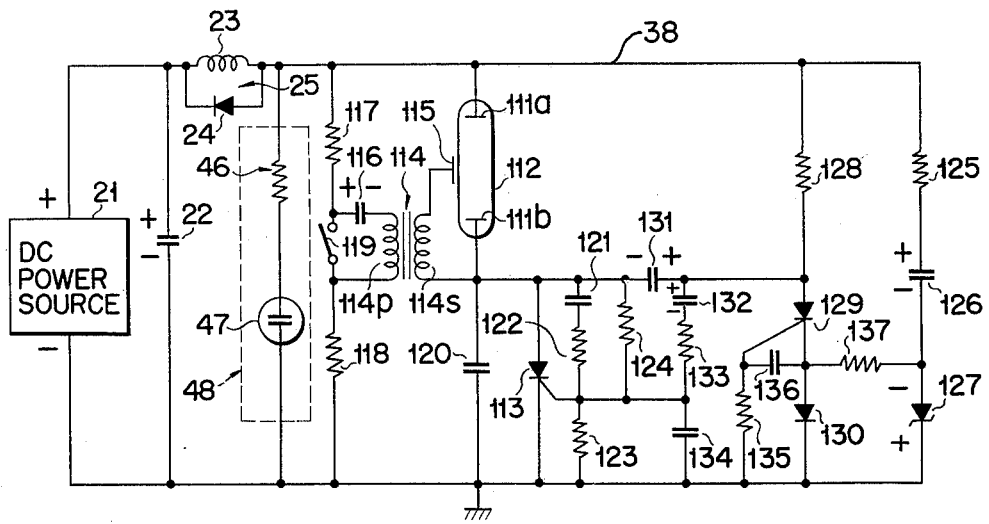
FIG. 6 shows a practical circuit arrangement of a main flashlight device according to this invention which can be substituted for the main flashlight device of FIG. 2.

FIG. 6 shows another practical circuit arrangement of the main flashlight device according to this invention which can be used in place of the main flashlight device of FIG. 2. In FIG. 6 reference numerals 21, 22, 25, 38 and 48 show a DC power source, flash capacitor, parallel circuit of an inductance coil 23 and diode 24, positive power source line and availability-confirming circuit, the arrangement being similar to those of FIG. 2.

Between the positive power source line 38 and ground is connected a flashlight source comprising a flash tube 112 having one main electrode 111a connected to the positive power source line 38, and a switching element, for example, a thyristor 113 having one main (anode) electrode connected to the other main electrode 111b of the flash tube 112 and the other main (cathode) electrode grounded. The flash tube 112 has a trigger electrode 115 connected to one terminal of a secondary winding 114S which, together with a primary winding 114P, constitutes a trigger transformer 114 with the primary and secondary windings electromagnetically coupled to each other. The other terminal of the secondary winding 114S of the transformer 114 is connected to the other main electrode 111b of the flash tube 112. One terminal of the primary winding 114P of the trigger transformer is connected through a trigger capacitor 116 and resistor 117 to the positive power source line 38. The other terminal of the primary winding 114P is connected to ground through a resistor 118 and also connected, through a normally open switch 119 closed according to the shutter operation of an associated camera (not shown), to a junction between the capacitor 116 and the resistor 117. Between the other main electrode 111b of the tube 112 and ground are connected a capacitor 120 and a series circuit of a capacitor 121 and resistors 122 and 123. The gate of the thyristor 113 is connected to a junction between the resistors 122 and 123 and also connected through a resistor 124 to the other main electrode 111b of the flash tube 112. Between the positive power source line 38 and ground a series circuit of a resistor 125, capacitor 126 and zener diode 127 with the indicated polarity is connected in parallel with a series circuit of a resistor 128, the main electrode path of a quench element, for example, an anode-cathode path of a thyristor 129 and a diode 130 with the indicated polarity.

The anode of the thyristor 129 is connected through a capacitor 131 to the other main electrode 111b of the flash tube 112, i.e., to the anode of the thyristor 113, and also connected to ground through a series circuit of a capacitor 132, resistor 133 and capacitor 134. A junction between the resistor 133 and the capacitor 134 is connected to the gate of the thyristor 113. The gate of the thyristor 129 is connected to ground through a resistor 135. A junction between the cathode of the thyristor 129 and the anode of the diode 130 is connected through a capacitor 136 to the gate of the thyristor 129 and also through a resistor 137 to a junction between the capacitor 126 and the anode of the zener diode 127.

The operation of the main flashlight device so arranged as shown in FIG. 6 will be explained below.

Suppose that, with the switch 119 opened, a voltage substantially equal to that of the DC power source 21 is precharged on the capacitors 22, 116, 126, 131 and 132. When, in this state, the switch 119 is closed in accordance with the shutter operation of the associated camera (not shown), the stored voltage on the trigger capacitor 116 is discharged through the closed switch 119 and primary winding 114P of the trigger transformer 114 to cause the trigger transformer to be excited. Since the flash tube 112 is triggered through the secondary winding 114S of the excited trigger transformer, the stored voltage on the flash capacitor 22 is discharged through the triggered flash tube 112, capacitor 121 and resistors 122 and 123, thereby causing the thyristor 113 to be turned on and consequently permitting a first flashlight ray to be emitted from the flash tube 112. At this time, the discharge current of the flash capacitor 22 is charged on the capacitor 120, whereby the capacitor 120 functions to compensate for an individual difference of that anode voltage of the thyristor 113 which is required to cause the thyristor 113 to be triggered. Simultaneously with the above-mentioned discharge of the flash capacitor 22, the stored voltage of the capacitor 126 is discharged through the resistor 125, triggered flash tube 112, fired thyristor 113 and zener diode 127 to cause a constant voltage, for example, about 12 volts to be inducted between the cathode and anode of the zener diode 127 with the indicated polarity. After the lapse of a time determined by a time constant obtained from a product of the capacitance of the capacitor 136 and the resistance of the resistor 135, the thyristor 129 is triggered into conduction. At the instant the thyristor 129 is rendered conductive, the above-mentioned stored voltage of the capacitor 131 is discharged through the fired thyristor 129, forwardly biased diode 130, conducting flash capacitor 22 and flash tube 112 to cause a reverse biasing voltage to be applied to the anode of the thyristor 113. At the same time, the above-mentioned voltage stored on the capacitor 132 is discharged through the fired thyristor 129, forwardly biased diode 130 and resistors 123 and 133 to cause a reverse biased voltage to be impressed on the gate of the thyristor 113. As a result, the thyristor 113 is forcefully turned off to cause a flashlight ray emitted from the flash tube 112 to be substantially interrupted temporarily. Immediately after the thyristor 113 is turned off in this way, the above-mentioned voltage stored on the flash capacitor 22 is discharged through the conducting flash tube 112, capacitors 131 and 132 and resistors 133 and 123 so as to charge the capacitors 131 and 132, since the flash capacitor 22 has a capacitance sufficiently greater than that of the capacitors 131 and 132. The voltage on the capacitors 131 and 132 thus stored is applied as a reverse biasing voltage to the anode of the thyristor 129 to cause the thyristor 129 to be forcefully again turned off and, at the same time, applied as a forward biasing voltage to the anode and gate of the thyristor 113 to cause the thyristor 113 to be again turned off, whereby a second flashlight ray is emitted from the flash tube 112.

From the above it will be evident to those skilled in the art that the main flashlight device of FIG. 6 can emit two flashlight rays 51 and 52 as shown in FIG. 3 or 5A upon the shutter operation of the associated camera, as in the main flashlight device of FIG. 2.

It will be also apparent that the capacitor 134 shown in FIG. 6 functions as a bypass capacitor for shunting a noise component included in a trigger current when the thyristor 113 is triggered as mentioned above.

Figure 7:
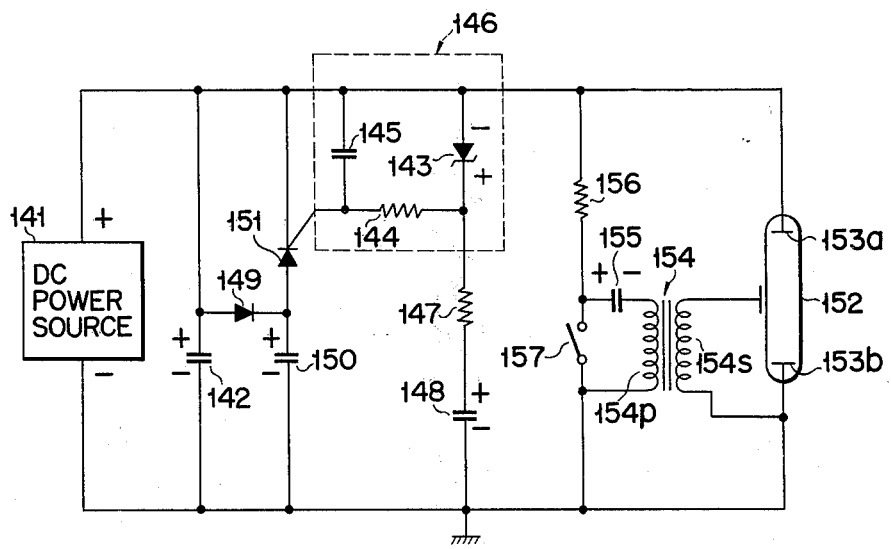
FIG. 7 shows a practical circuit arrangement of the main flashlight device used in a wireless multiflashlight apparatus according to another embodiment of this invention.

FIG. 7 shows a practical circuit arrangement of a main flashlight device used in a wireless multiflashlight apparatus according to another embodiment of this invention. In FIG. 7 a reference numeral 141 denotes a DC power source of about 300 volts which is similar to the DC power source 21 as shown in FIG. 2 or 6. Between the positive pole and grounded negative pole of the DC power source, a first flash capacitor 142 is connected. Across the flash capacitor 142 is connected a series circuit of a timer circuit 146 — similar in arrangement to the timer circuit 31 of FIG. 2 — comprising a zener diode 143 with the indicated polarity, a resistor 144 and a capacitor 145, a resistor 147 and a capacitor 148. The anode of the diode 149 is connected to one plate of the first flash capacitor 142 which is connected to the non-grounded positive pole of the DC power source 141. The cathode of the diode 149 is connected to ground through a second flash capacitor 150 and also connected through a main current conduction path of a switching element, for example, the cathode-anode path of a thyristor 151 to the positive pole of the DC power source 141. The gate of the thyristor 151 is connected to the output terminal of the timer circuit 146 i.e. a junction between the resistor 144 and the capacitor 145. Across the first flash capacitor 142 is further connected a pair of main electrodes 153a and 153b of a flash tube 152, for example, a xenon tube. The flash tube 152 has a trigger electrode connected to one terminal of a secondary winding 154S which, together wih a primary winding 154P, constitutes a trigger transformer 154 with the primary and secondary windings 154P and 154S electromagnetically coupled to each other. The other terminal of the secondary winding 154S is connected to ground. One terminal of the primary winding 154P of the trigger transformer 154 is connected through a trigger capacitor 155 and resistor 156 to the positive pole of the DC power source 141 and also connected, through a normally open switch 157 closed upon the shutter operation of an associated photographic camera (not shown), to the other grounded terminal of the primary winding 154P of the transformer.

The operation of the main flashlight device so arranged as shown in FIG. 7 will be explained below. Suppose that, with the switch 157 opened, a voltage substantially equal to that of the DC power source 141 is precharged on the capacitors 142, 148, 150 and 155. When in this state the switch 157 is closed according to the shutter operation of the associated camera, the stored voltage on the trigger capacitor 155 is discharged through the closed switch 157 and the primary winding 154P to cause the trigger transformer 154 to be excited.

When the trigger transformer 154 is so excited, the flash tube 152 is triggered through the secondary winding 154S of the excited trigger transformer 154, thereby causing the stored voltage on the first flash capacitor 142 to be discharged through the triggered flash tube 152 and in consequence permitting a first flashlight ray to be emitted from the flash tube 152. At the same time the stored voltage on the capacitor 148 is discharged through the resistor 147, zener diode 143 included in the timer circuit 146 and conducted flash tube 152 to cause a constant voltage, for example, about 12 volts to be induced between the cathode and anode of the zener diode 143 with the indicated polarity. The induced voltage is integrated on the capacitor 145 with time through the resistor 144 and the thyristor 151 is triggered after a lapse of time determined by a time constant obtained from a product of the capacitance of the capacitor 145 and resistance of the resistor 144. As a result, the stored voltage on the second flash capacitor 150 is discharged through the triggered thyristor 151 and flash tube 152 to cause a second flashlight ray to be emitted from the flash tube 152.

Figure 8A:
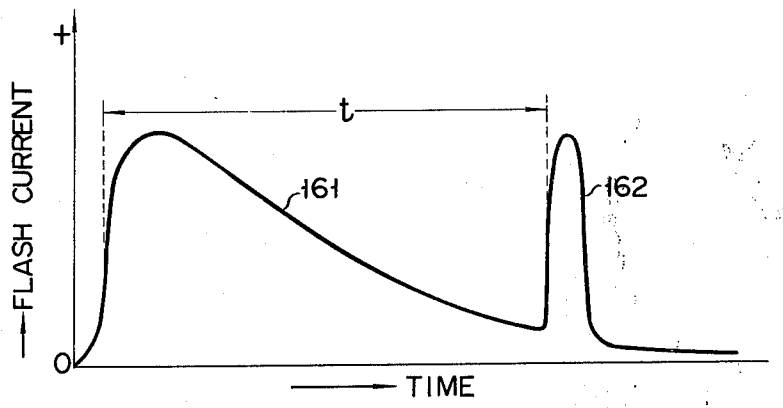
FIGS. 8A and 8B are graphical representations showing a relation between a lapse of time and the amount of current flowing through the flash tube of FIG. 7.
Figure 8B:
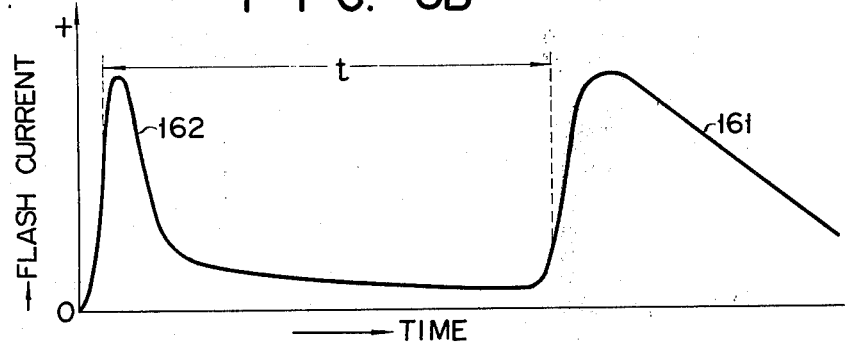

As will be appreciated from the above, if the first flash capacitor 142 is so preselected as to have a capacitance greater than the second flash capacitor 150, two flashlight rays 161 and 162 as shown in FIG. 8A are emitted from the flash tube 152 at a time interval t determined by a time constant obtained from a product of the resistance of the resistor 144 and capacitance of the capacitor 145. Conversely, if the second flash capacitor 150 is so preselected as to have a capacitance greater than that of the first flash capacitor 142, two flashlight rays 162 and 161 as shown in FIG. 8B are generated by the flash tube 152 at aforesaid time interval t.

Figure 9:
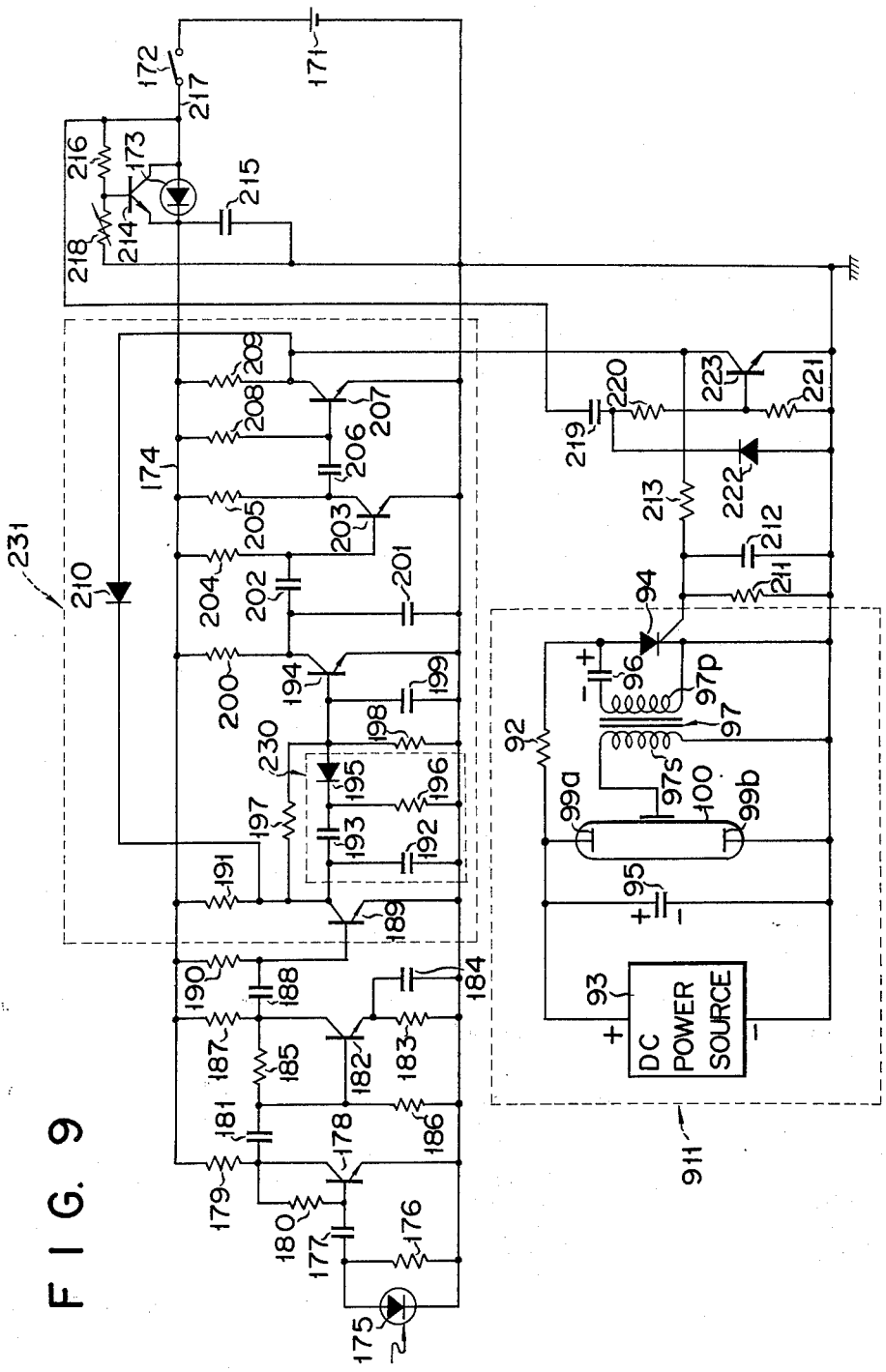
FIG. 9 shows a practical circuit arrangement of an additional flashlight device according to this invention which can be used in combination with the main flashlight device of FIG. 7.

FIG. 9 is a practical circuit arrangement of an additional flashlight device according to this invention which is used in combination with the main flashlight device of FIG. 7.

In FIG. 9 a reference numeral 171 designates a DC power source having a relatively low voltage of, for example, about 9 volts. The positive pole of the DC power source 171 is connected to a positive power source line 174 of a main circuit portion of FIG. 9 through a power switch 172 and a light emitting diode 173 having a forwardly connected anode-cathode path, and the negative pole of the DC power source 171 is connected to ground. Two flashlight rays 161 and 162, as shown in FIGS. 8A or 8B, generated by the flash tube 152 in the main flashlight device of FIG. 7 are received by a photoelectric conversion element, for example, a solar battery 175 having a grounded cathode. The anode of the solar battery 175 is returned to ground through a load resistor 176 and is connected to a coupling capacitor 177 which in turn is connected to the base of an npn type grounded-emitter transistor 178. The collector of the transistor 178 is connected through a resistor 179 to the positive power source line 174 and through a resistor 180 to the base of the transistor 178. The collector of the transistor 178 is also connected through a coupling capacitor 181 to the base of an npn type transistor 182 whose emitter is connected to ground through a parallel circuit of a resistor 183 and capacitor 184. The base of the transistor 182 is connected through a resistor 185 to the collector thereof and through a resistor 186 to ground. The collector of the transistor 182 is connected through a resistor 187 to the positive power source line 174 and also through a coupling capacitor 188 to the base of an npn type grounded-emitter transistor 189 which is connected through a resistor 190 to the positive power source line 174. The collector of the transistor 189 is connected through a resistor 191 to the positive power source line 174 and through a capacitor 192 to ground. The collector of the transistor 189 is also connected through a capacitor 193 to the cathode of a diode 195 having an anode connected to the base of an npn type grounded-emitter transistor 194, the cathode of the diode 195 being further connected to ground through a resistor 196. The base of the transistor 194 is connected through a resistor 197 to the collector of the transistor 189 and also through a parallel circuit of a resistor 198 and capacitor 199 to ground. The collector of the transistor 194 is connected through a resistor 200 to the positive power source line 174 and also through a capacitor 201 to ground. The collector of the transistor 194 is further connected through a coupling capacitor 202 to the base of an npn type grounded-emitter transistor 203, which is connected through a resistor 204 to the positive power source line. The collector of the transistor 203 is connected also through a resistor 205 to the positive power source line 174 and through a coupling capacitor 206 to the base of an npn type grounded-emitter transistor 207. The base of the transistor 207 is connected through a resistor 208 to the positive power source line 174. The collector of the transistor 207 is connected through a resistor 209 to the positive power source line 174 and also through a diode 210 with the indicated polarity to the collector of the transistor 189. There is further provided a flashlight source 911, similar in arrangement to that of FIG. 4, comprising a DC power source 93 having a relatively high voltage, for example, about 300 volts, a flash capacitor 95, a flash tube 100 having a pair of main electrodes 99a and 99b and a trigger electrode 98, a trigger transformer 97 consisting of primary and secondary windings 97P and 97S electromagnetically coupled to each other, a resistor 92, a trigger capacitor 96 and a thyristor 94 acting as a switching element. However, the flashlight source 911 of FIG. 9 is different from the flashlight source of FIG. 4 in that the gate of the thyristor 94 is connected through a parallel circuit of a resistor 211 and capacitor 212 to ground and also through a resistor 213 to the collector of the transistor 207.

In the additional flashlight device of FIG. 9, the following circuits are further provided. There is provided an npn type transistor 214 having a collector-emitter path connected in parallel with an anode-cathode path of the light emitting diode 173. The emitter of the transistor 214 connected to the cathode of the light emitting diode 173 is connected to ground through a capacitor 215. The base of the transistor 214 is connected through a resistor 216 to the anode of the light emitting diode 173 i.e., to a positive power source line 217 which is connected through a power switch 172 to the positive pole of the DC power source 171. The base of the transistor 214 is further connected to ground through a variable resistor 218. Between the positive power source line 217 and ground is conneced a series circuit of a capacitor 219 and resistors 220 and 221. A junction between the capacitor 219 and the resistor 220 is connected to ground through a diode 222 with the indicated polarity. A junction between the resistors 220 and 221 is connected to the base of an npn type grounded-emitter transistor 223 having a collector connected to the collector of the transistor 207.

The operation of the additional flashlight device so arranged as shown in FIG. 9 will be explained by reference to FIGS. 10A to 10G.

When any flashlight ray is not received by the solar battery 175, the collector potential (see FIG. 10F) of the transistor 207 is substantially equal to the ground potential, since the transistor 207 is set in a fully conducting state through the base biase resistor 208. At this time, the gate potential of the thyristor 94 is substantially equal to the ground potential and the thyristor 94 is held in a nonconductive state consequently and no flashlight ray is emitted from the flashlight tube 100 in the flashlight source 911. In this state, a voltage substantially equal to that of the DC power souce 93 is precharged on the flash capacitor 95 and trigger capacitor 96 in the flashlight source 911; the transistors 189 and 203 are set in a fully conducting state through the corresponding base biase resistors 190 and 204; and the transistor 194 is set in a nonconductive state.

When in this state two flashlight rays 161 and 162 (shown in FIGS. 8A and 10A from the standpoint of circuit consideration), as shown in FIGS. 8A or 10A, emitted at a time interval $t$ from the flash tube 152 in the main flashlight device of FIG. 7 are received (or flashlight rays as shown in FIG. 8B are received), electromotive forces having magnitudes in response to the received flashlight rays are induced between the anode and cathode of the solar battery 175. Accordingly, two signals having voltage levels in accordance with the induced electromotive forces are induced across the load resistor 176. Those portions of the two signals which have a greater level than a predetermined threshold are amplified by an amplifying section including transistors 178 and 182 and, thereafter being converted into two pulsating signals, are impressed as a reverse bias voltage on the base of the normally conducting transistor 189. For this reason, the transistor 189 is set in a nonconductive state only during the time period in which the above-mentioned two pulsating signals are applied thereto, and consequently the collector potential of the transistor 189 is switched from the ground potential to the potential of the positive power source line 174 (see FIG. 10B). Consequently, during the time period in which the transistor 189 is set in a nonconductive state by the first pulsating signal from the amplifying section, charging current of a predetermined value flows through the resistors 191 and 197 from the positive power source line 174 into the capacitor 199. At the instant the stored voltage (see FIG. 10C) on the capacitor 199 reaches a predetermined level, the transistor 194 is changed from a nonconductive state to a conductive state to cause the collector potential thereof to be varied from the potential of the positive power source line 174 to the ground potential (see FIG. 10D). When the transistor 189 is again set in a conductive state through the disappearance of the first pulsating signal from the amplifying section, the stored voltage on the capacitor 199 is discharged mainly through the forwardly biased diode 195, capacitor 193 and conducting transistor 189. As a result, the transistor 194 is again made nonconductive at the decay of the first pulsating signal from the amplifying section. If, in the circuitry of FIG. 9, a circuit portion 230 (enclosed by a dotted line) including the diode 195, resistor 196 and capacitors 192 and 193 are not provided, then an operational failure will take place where, for example, several noise signals each having an insufficient voltage level to cause a transistor 194 to be switched from a nonconductive state to the conductive state are successively applied to the circuitry of FIG. 9 and then integrated on the capacitor 199. Conversely where the above-mentioned circuit portion 230 is provided, the successive application of the aforesaid noise signals causes the stored voltage on the capacitor 199 upon receipt of each of the noise signals to be rapidly discharged through the forwardly biased diode 195 and capacitors 193 and 192 with the result that any erroneous operation otherwise occurring due to such noise signals can be assuredly prevented.

Thus at the instant the transistor 194 is changed from a nonconductive state to a conductive state by the first pulsating signal from the amplifying section, the transistor 203 is switched from a conductive state to a nonconductive state as shown in FIG. 10E. Subsequently, in a predetermined length of time after the transistor 194 is again made nonconductive through the decay of the first pulsating signal from the amplifying section, the transistor 203 is again held in a conducting state (see FIG. 10E). The transistor 207 is held in a conducting state until the transistor 203 is, after being once switched from a conductive state to a nonconductive state as mentioned above, again set in a conductive state, and consequently the collector potential of the transistor 207 is held substantially at the ground potential (see FIG. 10F). When the transistor 203 is set in a conductive state as mentioned above, the transistor 207 is set at a nonconductive state switched from a conductive state only during the time period determined by a differentiation circuit consisting of the resistors 205 and 208 and the capacitor 206. Thereafter, the transistor 207 is again made conductive. In the time period in which the transistor 207 is set in a nonconductive state as described above, the transistor 189 is set in a nonconductive state only when the second pulsating signal from the amplifying section is applied thereto. Consequently, in the time period in which the transistor 207 is set in a nonconductive state as mentioned above, the transistor 189 is set in a conductive state except when the second pulsating signal from the amplifying section is applied thereto, and in consequence the collector potential of the transistor 207 is set at a voltage higher than the ground potential due to a voltage drop caused by the resistance of the forwardly biased diode 210. Since, however, this voltage applied to the gate of the thyristor 94 is relatively low, the thyristor 94 is held in a nonconductive state without being triggered by this voltage. This prevents a flashlight ray from being emitted from the flash tube 100 in the flashlight source 911. In the time period in which the transistor 207 is set in a nonconductive state as mentioned above, the transistor 189 is set in a nonconductive state only when the second pulsating signal from the amplifying section is applied thereto. During this time period, therefore, the collector potential of the transistor 207 is set at the highest positive voltage substantially equal to that of the positive power source line 174, thereby causing the thyristor 94 to be turned on (see FIG. 10G). As a result, when the thyristor 94 is triggered a flashlight ray for illuminating a desired subject being photographed is emitted from the flash tube 100 in the flashlight source 911.

As will be understood from the above, a circuit portion 231 (enclosed by a dotted line in FIG. 9) including the transistors 189, 203 and 207 and diode 210 controls, upon receipt of two flashlight rays 161 and 162 as shown in FIG. 10A by the solar battery 175 included in the additional flashlight device of FIG. 9, each collector potential of the transistors 189 and 207 in accordance with the presence or the absence of the received flashlight rays 161 and 162 in the same manner as the conventional AND gate to cause the thyristor 94 to be triggered only when the normally conducting transistors 189 and 207 are simultaneously in a conducting state, thereby permitting a flashlight ray for illuminating a desired subject being photographed to be emitted from the flash tube 100 in the flashlight source 911. As a result, the aforesaid circuit portion 231 functions as one kind of decoder operative to produce an output signal only when the two flashlight rays 161 and 162 are received by the solar battery 175.

In the circuit arrangement of FIG. 9 the light emitting diode 173 emits a light, only during the time period in which the voltage of the DC power source 171 is held at a higher value than a predetermined level, indicating that the additional flashlight device of FIG. 9 is in the "availability" condition. In this case, the transistor 214 is held in a nonconductive state. When the voltage of the DC power source 171 becomes lower than a predetermined value, the light emitting diode 173 emits no light and in this state the emitter potential of the transistor 214 is so lowered that the transistor 214 is set in a conducting sate.

On the other hand, only when the power switch 172 is thrown in, a predetermined amount of current flows from the DC power source 171 through the capacitor 219 and resistors 220 and 221 to cause the transistor 223 to be rendered conductive, thereby preventing the flash tube 100 in the flashlight source 911 from being misflashed. The stored voltage at this time on the capacitor 219 is rapidly discharged through that one of the photoelectric diode 173 and the transistor 214, which is made conductive as mentioned above capacitor 215 and forwardly biased speed-up diode 222, whereby the transistor 223 is again set in a conductive state ready for the next operation.

Figure 11:
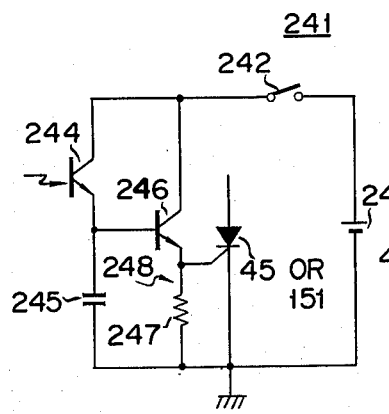
FIGS. 11 and 12 are different timer circuits each usable for a timer circuit shown in FIGS. 2 and 7.

FIG. 11 shows a modified circuit arrangement of the timer circuit 31 or 146 included in the circuit arrangement of FIGS. 2 or 7.

The timer circuit 241 comprises an npn type phototransistor 244 having a collector connected to the positive pole of a DC power source 243 through a normally open switch 242 which is closed together with the switch 40 or 157 shown in FIGS. 2 or 7, upon the shutter operation of the associated camera and said phototransistor is designed to be rendered conductive upon receipt of a flash light ray generated by the flash tube 26 or 152 of FIGS. 2 or 7 and then reflected from a subject being photographed; an integration capacitor 245 connected between the emitter of the transistor 244 and the grounded negative pole of the DC power source 243; and an amplifier 248 constructed of an npn type emitter follower transistor 246 having a base connected to the emitter of the phototransistor 244 and a collector connected through the switch 242 to the positive pole of the DC power source 243, and a resistor 247 connected between the emitter of the transistor 246 and ground. The emitter of the transistor 246 is connected to the gate electrode of the thyristor 45 or 151 shown in FIGS. 2 or 7.

The operation of the timer circuit 241 will be explained below.

When the switch 242 is closed in synchronism with the shutter operation of the associated camera and a flashlight ray emitted from the flash tube 26 or 151 of FIGS. 2 or 7 and reflected from a subject being photographed arrives, the phototransistor 244 is rendered conductive to cause photoelectric current to be conducted through the collector-emitter path thereof. The photoelectric current is charged or integrated on the capacitor 245 in proportion to a total amount of received light. When the integrated voltage on the capacitor 245 reaches a predetermined value, the transistor 246 is rendered conductive to cause the thyristor 45 or 151 to be turned on. When the reflecting light from the subject disappears in a predetermined length of time after the shutter operation of the associated camera, the phototransistor 244 is rendered nonconductive. Consequently, the stored voltage on the capacitor 245 is discharged through the transistor 248 and resistor 247 to cause the transistor 248 to be again rendered nonconductive ready for the next operation.

Figure 12:
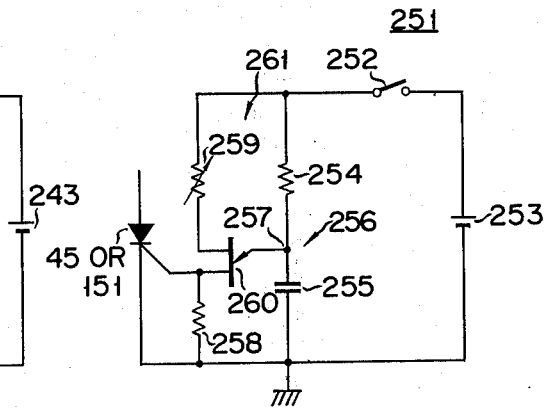

FIG. 12 is another modification of the timer circuit 31 or 146 shown in FIGS. 2 or 7.

The timer circuit 251 comprises a relaxation oscillator 261 which is constituted by a series circuit 256 of a resistor 254 and capacitor 255 connected across a DC power source 253 through a normally open switch 252 and which is closed together with the switch 40 or 157 shown in FIGS. 2 or 7 upon the shutter operation of an associated camera; and a unijunction transistor or double base diode 260 having an emitter connected to a junction between the resistor 254 and the capacitor 255, a first base connected through a resistor 258 to the grounded negative pole of the DC power source 253 and a second base connected through a variable resistor 259 to the nongrounded terminal of the series circuit 256.

The operation of the timer circuit 251 will be explained below.

When the switch 252 is closed according to the shutter operation of the associated camera, a predetermined amount of charging current flows from the DC power source 253 through the closed switch 252 and resistor 254 into the capacitor 255 and consequently a voltage increasing with a lapse of time is induced across the capacitor 255. The double base diode 260 is rendered conductive, by the stored voltage on the capacitor 255, after a time determined by a time constant obtained from a product of the capacitance of the capacitor 255 and the resistance of the resistor 254. Consequently a predetermined voltage is induced across the resistor 258 to permit the thyristor 45 or 151 to be triggered. When the double base diode 260 is rendered conductive as mentioned, the stored voltage on the capacitor 255 is discharged through the conducting double base diode 260 and resistor 258 to cause the double base diode 260 to be again rendered nonconductive. Thus, timer circuit 251 of FIG. 12 is constituted by the so-called relaxation oscillator operative to intermittently emit a pulsating signal from the double base diode 260 through the aforesaid charge and discharge operation of the capacitor 255 until the switch 252 is again opened.

As will be apparent from the above, the timer circuit 31 or 146 shown in FIGS. 2 or 7 can be easily replaced by the timer circuit 241 or 251 of FIGS. 11 or 12.

It is needless to say that this invention is not restricted to the above-mentioned embodiments but applicable to any modification as falling within the spirit and scope of this invention.

For example, the main flashlight device of FIG. 2 is designed to emit only two flashlight rays 51 and 52 (see FIG. 3) from the flash tube 26 upon the shutter operation of the associated camera. However, the subject main flashlight device may be modified, as shown in FIG. 13, by connecting a plurality (two in this example) of series circuits each comprising a parallel circuit 441 or 442 consisting of a capacitor 421 or 422 and a resistor 431 or 432, and a thyristor 451 or 452 between the positive power source line 38 and ground; and also connecting to a zener diode 32 in a timer ciruit 311. The timer circuit includes a plurality of integration circuits equal in number to the series circuits and each having a resistor 331 or 332 and a capacitor 341 or 342, each output terminal of the integration circuits being connected to the gate of the corresponding thyristor 451 or 452. Then it will be evident that any number (three in this example) of flashlight rays 271, 272 and 273 can be emitted, as shown in FIG. 14, from the flash tube 26.

Figure 15:
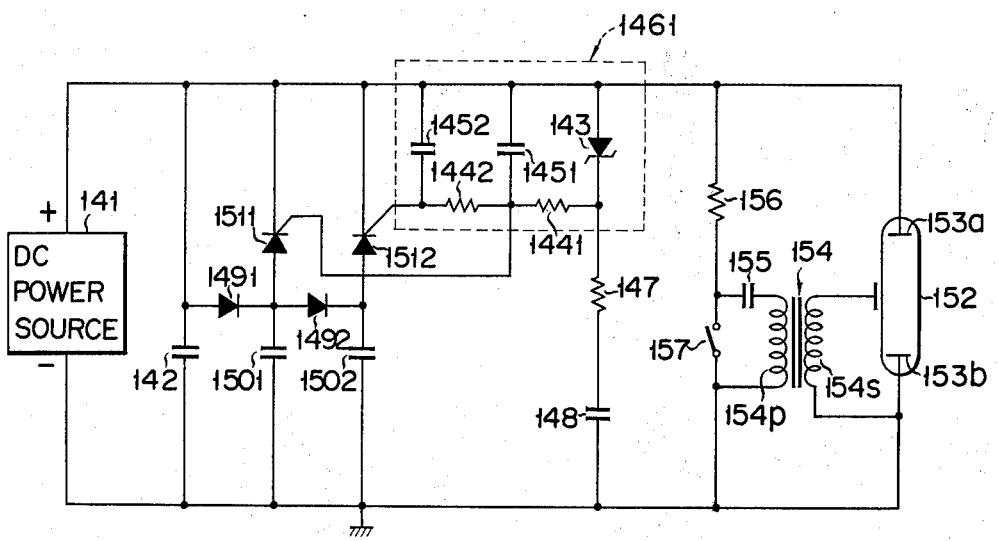
FIG. 15 is a practical circuit arrangement of a main flashlight device modified from FIG. 7.
Figure 16:
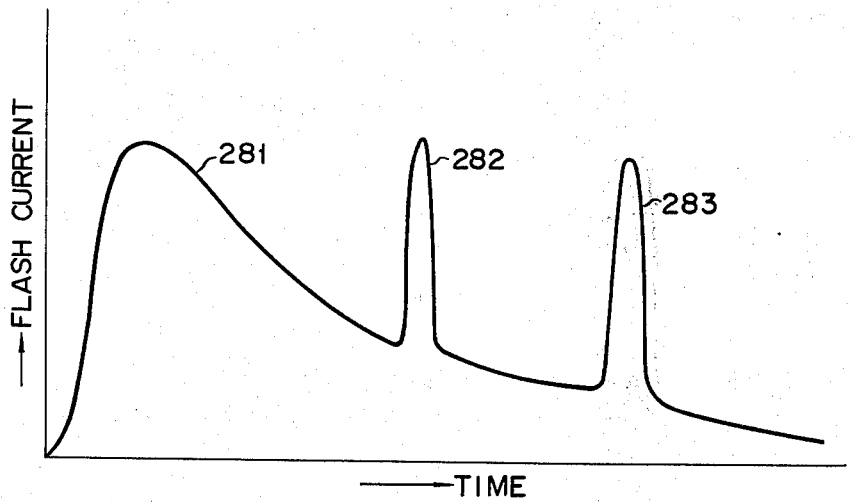
FIG. 16 shows a waveform of a flashlight as generated from the flash tube of FIG. 15.

The main flashlight device of FIG. 7 is also arranged to emit only two flashlight rays 161 and 162 (see FIGS. 8A or 8B) from the flash tube 152 upon the shutter operation of the associated camera. However, the main flashlight device may be modified, as shown in FIG. 15, by providing a plurality (two in this example) of circuits —similar in arrangement to the circuit of FIG. 7 including the diode 149, flash capacitor 150 and thyristor 151 — each comprising a diode 1491 or 1492, flash capacitor 1501 or 1502 and thyristor 1511 or 1512, and by connecting to a zener diode 143 in a plurality of timer circuit 146 integration circuits equal in number to the aforesaid circuits and each having a resistor 1441 or 1442 and a capacitor 1451 or 1452, each output terminal of the integration circuits being connected to the gate of the corresponding thyristor 1511 or 1512. Then, it will be apparent that any number (three in this example) of flashlight rays 281, 282 and 283 can be emitted, as shown in FIG. 16, from the flash tube 152 upon the shutter operation of the associated camera. It will also be apparent that the additional flashlight device of FIG. 4 can be used in combination with the main flashlight device of FIG. 13 and that the additional flashlight device of FIG. 9 can be used in combination with the main flashlight device of FIG. 15.

For ease in understanding the operation of the above-mentioned circuits the most desirable values of each circuit element used in the respective circuits are shown below.

| Resistors | | Resistors | | Resistors | |
|---|---|---|---|---|---|
| 30 | 4.7 KΩ | 87 | 10 KΩ | 144 | 100 KΩ |
| 33 | 4.7 KΩ | 88 | 100 KΩ | 147 | 10 KΩ |
| 37 | 3.3 MΩ | 90 | 2.2 KΩ | 156 | 3.3 MΩ |
| 43 | 100 KΩ | 92 | 2.2 MΩ | 176 | 1 KΩ |
| 46 | 1 MΩ | 117 | 3.3 MΩ | 179 | 4.7 KΩ |
| 60 | 4.7 KΩ | 118 | 3.3 MΩ | 180 | 100 KΩ |
| 62 | 47 Ω | 122 | 10 Ω | 183 | 1 KΩ |
| 66 | 330 Ω | 123 | 470 Ω | 185 | 150 KΩ |
| 72 | 68 KΩ | 124 | 15 KΩ | 186 | 33 KΩ |
| 73 | 22 KΩ | 125 | 2.2 KΩ | 187 | 2.2 KΩ |
| 74 | 1.5 KΩ | 128 | 47 KΩ | 190 | 150 KΩ |
| 78 | 68 KΩ | 133 | 680 Ω | 191 | 5.6 KΩ |
| 79 | 4.7 KΩ | 135 | 1 KΩ | 196 | 47 KΩ |
| 82 | 1 KΩ | 137 | 4.7 KΩ | 197 | 47 KΩ |
| 83 | 1 KΩ | | | 198 | 15 KΩ |
| Resistors | | Resistors | | Capacitors | |
| 200 | 33 KΩ | 221 | 68 KΩ | 22 | 700 μF |
| 204 | 330 KΩ | 247 | 1 KΩ | 34 | 0.22 μF |
| 205 | 82 KΩ | 254 | 100 KΩ | 36 | 0.05 μF |
| 208 | 82 KΩ | 258 | 470 Ω | 41 | 0.22 μF |
| 209 | 1 KΩ | 331 | 4.7 KΩ | 42 | 33 μF |
| 211 | 1 KΩ | 332 | 4.7 KΩ | 63 | 470 μF |
| 213 | 2.2 KΩ | 431 | 100 KΩ | 68 | 0.018 μF |
| 216 | 820 Ω | 432 | 100 KΩ | 75 | 47 μF |
| 218 | 10 KΩ | 1441 | 10 KΩ | 76 | 0.01 μF |
| 220 | 22 KΩ | 1442 | 10 KΩ | 84 | 0.0033 μF |
| Capacitors | | Capacitors | | Inductance coil | |
| 86 | 0.02 μF | 192 | 0.01 μF | 23 | 40 μH |
| 95 | 700 μF | 193 | 0.01 μF | | |
| 116 | 0.05 μF | 199 | 0.02 μF | | |
| 120 | 0.047 μF | 201 | 0.22 μF | | |

-continued

| Resistors | | Resistors | | Resistors | |
|---|---|---|---|---|---|
| 121 | 0.001 μF | 202 | 0.01 μF | | |
| 126 | 0.047 μF | 206 | 0.1 μF | | |
| 131 | 3.3 μF | 212 | 0.047 μF | | |
| 132 | 0.018 μF | 215 | 100 μF | | |
| 134 | 0.1 μF | 219 | 10 μF | | |
| 136 | 0.33 μF | 245 | 0.22 μF | | |
| 142 | 600 μF (100 μF) | 255 | 0.1 μF | | |
| | | 341 | 0.15 μF | | |
| 145 | 0.33 μF | | | | |
| | | 342 | 0.15 μF | | |
| 148 | 0.22 μF | | | | |
| | | 421 | 22 μF | | |
| 150 | 100 μF (600 μF) | 422 | 22 μF | | |
| 155 | 0.05 μF | 1451 | 0.33 μF | | |
| 177 | 0.22 μF | 1452 | 0.33 μF | | |
| 181 | 0.33 μF | 1501 | 100 μF | | |
| 184 | 47 μF | 1502 | 100 μF | | |
| 188 | 0.01 μF | | | | |

What is claimed is:

1. In a wireless multiflashlight apparatus comprising:
a main flashlight device including a first flash capacitor on which a predetermined voltage is precharged, and a first flash tube coupled substantially across said first flash capacitor to emit a first flashlight ray for illuminating a subject being photographed through the discharge of the voltage precharged on said first flash capacitor upon the shutter operation of the camera; and
at least one additional flashlight device located in the neighborhood of the subject and away from said main flashlight device, said at least one additional flashlight device including a photoelectric conversion element operative to receive flashlight rays emitted from said first flash tube, an amplifier section coupled to said photoelectric conversion element, a switching element coupled to said amplifier section to be made operative by an output signal from said amplifier section, and a flashlight source which includes a second flash capacitor on which a predetermined voltage is precharged, and a second flash tube coupled to said switching element and to said second flash capacitor to emit a flashlight ray for illuminating the subject simultaneously with that from said first flash tube through the discharge of the voltage precharged on said second flash capacitor when a flashlight ray delivered from said first flash tube is received by said photoelectric conversion element and said switching element is made operative by an output signal from said photoelectric conversion element obtained through said amplifier section;
the improvement wherein:
said main flashlight device further comprises an additional flashlight generating means coupled to said first flash tube for generating at least a second flashlight ray from said first flash tube, with a predetermined time interval between said first and second flashlight rays, upon the shutter operation of the camera; and
said additional flashlight device further comprises a decoder circuit coupled via said photoelectric conversion element between said amplifier section and said switching element for producing an output signal only responsive to at least two flashlight rays delivered from said main flashlight device being received by said photoelectric conversion element with said predetermined time interval therebetween, said output signal being coupled to said switching element for causing said switching element to become operative to cause a flashlight ray to be emitted from said second flash tube.

2. A wireless multiflashlight apparatus claimed in claim 1, wherein:
said additional flashlight generating means included in said main flashlight device comprises a temporary flashlight interruption circuit comprising at least one series circuit connected across said first flash capacitor as well as said first flash tube, said series circuit including a parallel circuit of a capacitor and a resistor, and a further switching element which has a pair of main electrodes connected in series with said parallel circuit and a control electrode; and a timer circuit operatively coupled to the shutter of a camera and having an output terminal coupled with the control electrode of said further switching element and producing an output signal for causing said further switching element to be rendered operative a predetermined period of time after the operation of the shutter of the camera, thereby causing a discharge current flowing from said first flash capacitor into said first flash tube to be temporarily substantially reduced by charging said capacitor included in said parallel circuit therewith and subsequently to be substantially increased by rendering said further switching element inoperative at the completion of the charging operation of said capacitor of said parallel circuit; and
said decoder circuit included in said additional flashlight device comprises a dc source having a positive terminal and a negative terminal; a first normally conductive transistor which has a base coupled via said amplifier section with said photoelectric conversion element, an emitter coupled with one of said positive and negative dc source terminals and a collector connected via a first resistor to the other dc source terminal, and which is rendered nonconductive through said amplifier section upon receipt of said at least first and second flashlight rays delivered from said main flashlight device by said photoelectric conversion element; a first capacitor which has one plate terminal connected to a junction of said first resistor with the collector of said first transistor and the other plate terminal connected via a second resistor to said one dc source terminal, and on which a voltage substantially equal to that of said dc source is charged when said first transistor is conductive; a second normally conductive transistor which has a base connected via a second capacitor to said one dc source terminal and also via a resistive element to a junction of said first capacitor with said second resistor, an emitter coupled with said one dc source terminal and a collector connected via a third resistor to the other dc source terminal, and which is rendered nonconductive, each time said first transistor is changed from a nonconductive state to a conductive state, as a function of the discharge of the voltage stored on said first capacitor obtained through the then conducting first transistor and said second capacitor; a first diode having a cathode connected to the collector of said first transistor and an anode connected to the collector of said second transistor; and a second diode having an anode connected to the collector of said second transistor and a cathode connected via at least one resistor to said one dc source terminal as well as coupled with the control electrode of said switching element included in said additional flashlight device, thereby permitting said switching element to be rendered operative only upon receipt of said at least first and second flashlight rays delivered from said main flashlight device by said photoelectric conversion element.

3. A wireless multiflashlight apparatus according to claim 1, wherein:

said main flashlight device further includes a first switching element having a pair of main electrodes connected in series with those of said first flash tube and a control electrode coupled to said first flash capacitor and triggered through the discharge of the voltage precharged on said first flash capacitor upon operation of the shutter of the camera;

said additional flashlight generating means included in said main flashlight device comprises a temperary flashlight interruption circuit comprising a second switching element having a pair of main electrodes coupled via a resistor substantially across said first flash capacitor and a control electrode; a timer circuit having an output terminal coupled with the control electrode of said second switching element and producing an output signal for causing said second switching element to be rendered operative a predetermined period of time after the shutter operation of the camera; and a capacitor on which a predetermined voltage is precharged and which is coupled between a junction of said second switching element with said resistor and a junction of said first switching element with said first flash tube firstly to discharge the capacitor at the triggering of said second switching element through the now conducting second switching element, said first flash capacitor, the now conducting first flash tube and first switching element, thereby causing said first switching element to be forcedly rendered inoperative temporarily, and subsequently to recharge the capacitor with a continuous discharge current obtained through the now conducting first flash tube from said first flash capacitor, thereby causing said first switching element to be again rendered operative; and said decoder circuit included in said additional flashlight device comprises a dc source having a positive terminal and a negative terminal; a first normally conductive transistor which has a base coupled via said amplifier section with said photoelectric conversion element, an emitter coupled with one of said positive and negative dc source terminals and a collector connected via a first resistor to the other dc source terminal; and which is rendered nonconductive through said amplifier section upon receipt of said at least first and second flashlight rays delivered from said main flashlight device by said photoelectric conversion element; a first capacitor which has one plate terminal connected to a junction of said first resistor with the collector of said first transistor and the other plate terminal connected via a second resistor with said one dc source terminal, and on which a voltage substantially equal to that of said dc source is charged when said first transistor is conductive; a second normally conductive transistor which has a base connected via a second capacitor to said one dc source terminal and also via a resistive element to a junction of said first capacitor with said second resistor, an emitter coupled with said one dc source terminal and a collector connected via a third resistor to the other dc source terminal, and which is rendered nonconductive, each time said first transistor is changed from a nonconductive state to a conductive state, as a function of the discharge of the voltage stored on said first capacitor obtained through the then conducting first transistor and said second capacitor; a first diode having a cathode connected to the collector of said first transistor and an anode connected to the collector of said second transistor; and a second diode having an anode connected to the collector of said second transistor and a cathode connected via at least one resistor to said one dc source terminal as well as coupled with the control electrode of said switching element included in said additional flashlight device, thereby permitting said swithcing element to be rendered operative only upon receipt of said at least first and second flashlight rays delivered from said main flashlight device by said photoelectric conversion element.

4. A wireless multiflashlight apparatus according to claim 1, wherein:

said additional flashlight generating means included in said main flashlight device comprises at least one additional flash capacitor which has one plate terminal connected to one plate terminal of said first flash capacitor and the other plate terminal connected via a forwardly biased diode to the other plate terminal of said first flash capacitor, and on which a voltage substantially equal to that precharged on said first flash capacitor is precharged; a further switching element having a pair of main electrodes connected between the other plate terminal of said additional flash capacitor and the other plate terminal of said first flash capacitor and a control electrode; and a timer circuit having an ouput terminal coupled with the control electrode of said further switching element and producing an output signal for causing said further switching element to be rendered operative a predetermined period of time after operation of the shutter of the camera, thereby causing the voltage precharged on said additional flash capacitor to be discharged into said first flash tube; and said decoder circuit included in said additional flashlight device comprises a dc source having a positive terminal and a negative terminal; a first normally conductive transistor which has a base coupled via said amplifier section with said photoelectric conversion element, an emitter coupled with one of said positive and negative dc source terminals and a collector coupled via a first resistor with the other dc source terminal, and which is rendered nonconductive through said amplifier section upon receipt of said at least first and second flashlight rays delivered from said main flashlight device by said photoelectric conversion element; a second normally nonconductive transistor which has a base coupled via a second resistor with the collector of said first transistor and also via a first capacitor to said one dc source terminal, an emitter coupled with said one dc source terminal and a collector coupled via a third resistor with the other dc source terminal, and which is rendered conductive when a voltage charged on said first capacitor obtained through said first and second resistors from the other dc source terminal at the nonconduction of said first transistor reaches a predetermined level; a third normally conductive transistor which has a base coupled via a second capacitor with the collector of said second transistor, an emitter coupled with said one dc source terminal and a collector coupled via a fourth resistor with the other dc source terminal, and which is rendered nonconductive when said second transistor is changed from a nonconductive state to a conductive state; a fourth normally conductive transistor which has a base coupled via a third capacitor with the collector of said third transistor as well as via a fifth resistor with the other dc source terminal, an emitter coupled with said one dc source terminal and a collector coupled with the control electrode of said switching element included in said additional flashlight device as well as with the other dc source terminal via a sixth resistor, said third capacitor and said fourth and fifth resistors comprising a differentiation circuit which renders said fourth transistor nonconductive a predetermined period of time after said third transistor is changed from a nonconductive state to a conductive state; and a diode which is coupled between the collector of said first transistor and the collector of said fourth transistor, and which is rendered nonconductive to trigger said switching element, only when said first and fourth transistors are simultaneously in a nonconductive state.

5. A wireless multiflashlight apparatus according to claim 4, wherein said decoder circuit further includes a noise signal bypass means coupled between the collector of said first transistor and the base of said second transistor, said noise signal bypass means comprising a fourth capacitor connected between the collector of said first transistor and said one dc source terminal; a series circuit connected between the collector of said first transistor and the base of said second transistor and comprised of a fifth capacitor and a second diode with its anode-cathode path forwardly biased; and a seventh resistor connected between a junction of said fifth capacitor with said second diode and said one dc source terminal, and acting to bypass, where noise signals having a smaller level than a voltage level required to make said second transistor conductive are received and charged on said first capacitor connected between said second transistor base and said one dc source terminal.

6. A wireless multiflashlight apparatus according to claim 1, wherein said first flash tube has a pair of main electrodes, and wherein said main flashlight device further includes an inductor coupled between one plate of said first flash capacitor and one main electrode of said first flash tube to improve the rise time characteristic of a discharge current from said first flash capacitor to said first flash tube.

7. A wireless multiflashlight apparatus according to claim 1, wherein said main flashlight device further includes an indicator tube connected through a resistor across said first flash capacitor and lighted only when the voltage precharged on said first flash capacitor increases over a predetermined level.

8. A wireless multiflashlight apparatus according to claim 1 wherein said main flashlight device is mounted on a photographic camera, said at least one additional flashlight device being located remote from said camera.

* * * * *